US012228801B1

(12) United States Patent
Okoli et al.

(10) Patent No.: US 12,228,801 B1
(45) Date of Patent: Feb. 18, 2025

(54) HINGE ASSEMBLY FOR EYEWEAR (71) Applicants: Chukwubuikem Marcel Okoli, Los Angeles, CA (US); Benamanahalli K. Nagaraj, Manhattan Beach, CA (US); Nicholas Streets, Los Angeles, CA (US); Stephen Andrew Steger, Los Angeles, CA (US); Jordan Wakser, Los Angeles, CA (US); Choonshin You, Irvine, CA (US); Ugur Olgun, West Hollywood, CA (US)

(72) Inventors: Chukwubuikem Marcel Okoli, Los Angeles, CA (US); Benamanahalli K. Nagaraj, Manhattan Beach, CA (US); Nicholas Streets, Los Angeles, CA (US); Stephen Andrew Steger, Los Angeles, CA (US); Jordan Wakser, Los Angeles, CA (US); Choonshin You, Irvine, CA (US); Ugur Olgun, West Hollywood, CA (US)

(73) Assignee: Snap Inc., Santa Monica, CA (US)

( * ) Notice: Subject to any disclaimer, the term of this patent is extended or adjusted under 35 U.S.C. 154(b) by 417 days.

(21) Appl. No.: 17/716,136

(22) Filed: Apr. 8, 2022

(51) Int. Cl.
*G02C 5/22* (2006.01)
*G02C 11/00* (2006.01)

(52) U.S. Cl.
CPC ............ *G02C 5/2254* (2013.01); *G02C 11/00* (2013.01)

(58) Field of Classification Search
CPC .............................. G02C 5/2254; G02C 11/00
See application file for complete search history.

(56) References Cited

U.S. PATENT DOCUMENTS

2008/0278677 A1* 11/2008 Gottschling ........... G02C 5/008
351/116

* cited by examiner

*Primary Examiner* — James C. Jones
(74) *Attorney, Agent, or Firm* — CM Law; Stephen J. Weed (57) ABSTRACT

Eyewear hinge assemblies for eyewear that connect temples to a frame. The hinge assemblies include hinge elements that are attached to the temples in an extended state, which stores an initial amount of energy or pre-load. The pre-load biases the temples inwardly and toward one another. After the temples are placed on the user's head, stored energy in the hinge elements can be released as the hinge elements exhibit elastic recoil. This causes the temples to grip the sides of the user's head in a snug and comfortable fit. The hinge assemblies have compact designs with material properties that provide comfortable closing forces while aiding in the reduction of electromagnetic noise from electrical subsystems in the eyewear.

21 Claims, 6 Drawing Sheets

HINGE ASSEMBLY FOR EYEWEAR

FIELD

The present disclosure relates generally to augmented reality eyewear and, more particularly, to a hinge assembly that improves eyewear performance and a user's experience.

BACKGROUND

Augmented reality (AR) is a live direct or indirect view of a physical, real-world environment whose elements are augmented (or supplemented) by computer-generated images such as video or graphics. AR display systems can be incorporated into wearable devices such as eyewear. Eyewear performance can be impacted by variables such as how well the eyewear fits a user's head and electromagnetic interference (EMI) produced by internal components.

BRIEF DESCRIPTION OF THE DRAWING FIGURES

The present disclosure is best understood from the following detailed description when read in connection with the accompanying drawings. The various features of the drawings are not drawn to scale unless otherwise indicated. Included in the drawings are the following figures.

DETAILED DESCRIPTION

A hinge assembly for eyewear that accommodates differing head sizes, while providing a good gripping force and improved comfort. The hinge assembly attaches a temple of the eyewear to the eyewear frame. Intrinsic material properties of the hinges provide the spring force needed to open and close the temples of the eyewear without causing material failure. Hinge elements are attached to the temples in an extended state, which stores an initial amount of energy or pre-load. The pre-load biases the temples inwardly and toward one another. After the temples are placed on the user's head, stored energy in the hinge elements can be released as the hinge elements exhibit elastic recoil. The hinge assembly has a compact design with material properties that provide comfortable closing forces while aiding in the reduction of noise from electrical subsystems in the eyewear.

Numerous details are set forth in the following detailed description by way of examples in order to provide a thorough understanding of the relevant teachings. However, it should be apparent to those skilled in the art that the present teachings may be practiced without such details, or with the details featured in different arrangements and combinations.

The term "attached" or "attachment", as used herein, can mean a direct connection of two objects in which the two objects are adjacent and contact one another, or an indirect attachment in which the two objects are connected by one or more elements, joints, bonds, welds or other connection means between the two objects. The terms "extend", "extended" and the like, when used herein in the context of movement between segments of a bent object, mean a movement that increases the angle between segments of the object up to 180 degrees. The terms "hyperextend", "hyperextended" and the like, when used herein in the context of movement between segments of a bent object, mean a further extended movement that increases the angle between segments of the object to an angle greater than 180 degrees. The terms "pre-bend", "pre-bent", and the like, when used herein in the context of a hinge element, means that the hinge element has undergone a plastic deformation to form a bent configuration, and returns to the bent configuration by elastic recoil after being extended or hyperextended. The term "one-piece body", when used herein to describe the hinge element, means a monolithic and homogeneous structure of unitary construction, as opposed to a structure made up of parts interconnected by welding, fasteners, or other mode of assembly. Lastly, the terms "pre-load", "pre-loaded" and the like, as when used herein in the context of hinge elements, means stored energy, or the quality of having stored energy when the hinge element is elastically deformed by an external force to an extended or hyperextended state.

The present disclosure describes an eyewear device and hinge assemblies that are incorporated into the eyewear device. One example of the eyewear device includes a frame and a pair of temples that project from opposing sides of the frame. The temples are spaced apart to allow a user to rest the temples over their ears and position the frame on the bridge of their nose, with the frame in front of their face and the lenses or displays in front of their eyes.

Each temple is connected to the frame with a hinge assembly. The hinge assemblies can include pre-bent hinge elements that are attached to the temples. Each hinge element can be attached to a temple. The pre-bent hinge element is initially in a bent state, but is extended from the bent state to an extended state as the hinge element is attached to the temple. After the hinge element is attached to the temple, the hinge element is retained in the extended state, which stores a pre-load in the hinge element. The pre-loads in the hinge elements bias the temples inwardly and toward one another.

When the eyewear is placed on the user, the temples can be displaced outwardly and away from one another to fit around the user's head. After the temples are placed on the user's head, stored energy in the hinge elements cause the temples to gently compress and grip the sides of the user's head in a snug and comfortable fit. Energy can be stored in each hinge element as a result of extension or hyperextension, depending on the degree of outward displacement of each temple.

Each hinge element can be formed of any material capable of being pre-loaded. In addition, each hinge element can have a one-piece design. For example, each hinge element can be formed from a thin plate, band or web of material. A one-piece geometry allows the pre-load to be adjusted or tuned by a modification to the hinge element, such as a change in the material that forms the hinge element, or a change in the thickness of the hinge element. This allows the pre-load to be modified without resorting to a complete redesign of the hinge assembly. A one-piece geometry also allows the hinge element to have a slim and compact size that fits inside a narrow temple profile, avoiding complex part geometries that increase the size and weight of the hinge assembly. The slim and compact geometry further allows the hinge element to slide or translate on mounts, reducing shear stresses on the mounts and preventing elongation of the hinge. Lastly, the material properties and shape of the hinge element provide a wall that converts noise signals from nearby electrical and optical components to surface currents, which are short circuited by a grounding system.

Figure 1:
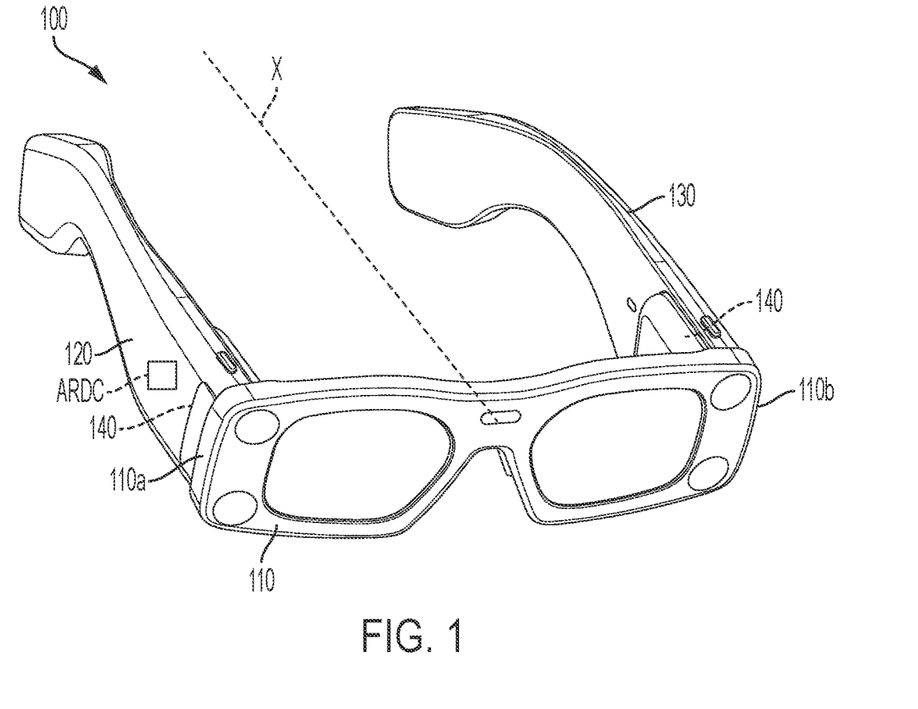
FIG. 1 is a perspective view of eyewear according to one example.
Figure 2:
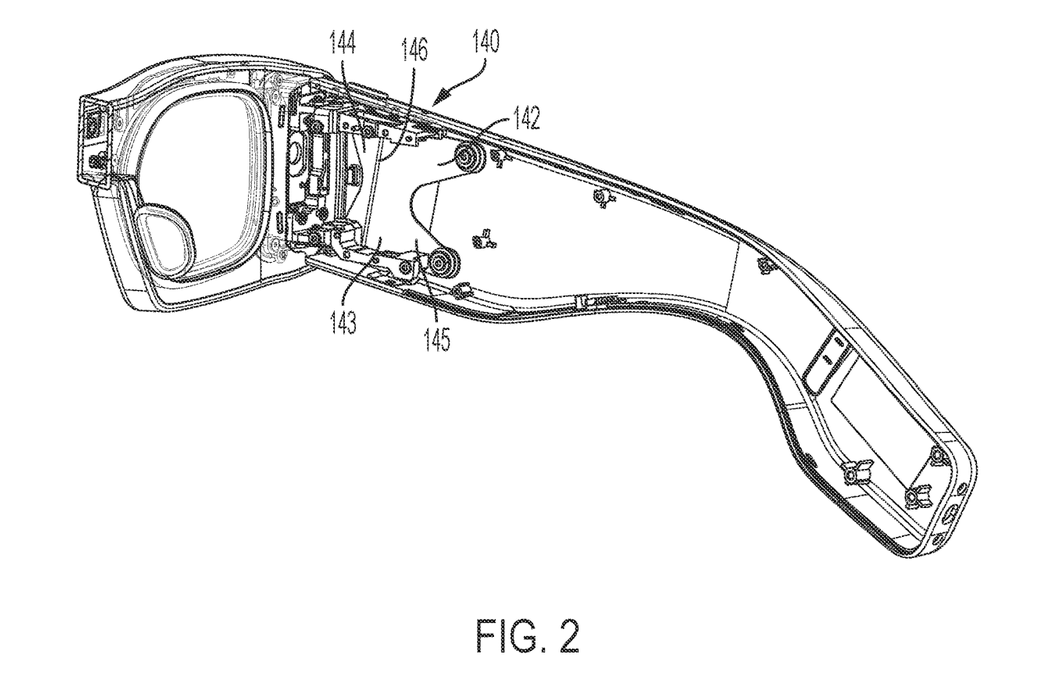
FIG. 2 is a truncated perspective view of one side of the eyewear in FIG. 1, with interior areas exposed to show some of the internal elements.

Referring to FIG. 1, an eyewear device 100 for AR is shown according to one example. Eyewear device 100 includes a frame 110, a first temple 120 and a second temple 130. The frame 110, first temple 120 and second temple 130 have hollow areas that house various internal components together, including a processing unit, camera, lenses, mirrors, waveguides, Wi-Fi antenna, and other components of an AR display system. These components are not shown in detail in the drawing figures, but rather are represented collectively in FIG. 1 in a single location by reference sign "ARDC", which is short for AR display components. Reference sign ARDC encompasses the various internal components known in the art for operating AR display systems, which are incorporated by reference herein. These internal components are not shown in greater detail to allow for clearer illustration of the hinge assemblies and other surrounding structure.

First temple 120 is connected to a first end 110a of frame 110, and second temple 130 is connected to a second end 110b of the frame. First temple 120 and second temple 130 are attached to frame 110 by hinge assemblies 140. Hinge assemblies 140 are configured to allow first temple 120 to pivot relative to first end 110a and allow second temple 130 to pivot relative to second end 110b. The hinge assembly 140 that connects first temple 120 to frame 110 functions identically to the hinge assembly 140 that connects second temple 130 to the frame. Moreover, the geometries and arrangement of parts of each hinge assembly 140 are mirrored with respect to an axis of symmetry X that passes through the center of eyewear device 100 shown in FIG. 1. For brevity, this description will only describe details of the hinge assembly 140 that connects first temple 120 to frame 110, with the understanding that the hinge assembly 140 connecting second temple 130 to the frame is identical but in a mirrored configuration.

Referring to FIGS. 2-5, hinge assembly 140 includes a plate 142 having a one-piece body 143. The one-piece body 143 has a first plate section 144, a second plate section 145, and a hinge section 146 that separates the first plate section from the second plate section. First plate section 144 is attached to an adaptor 150 which, in turn, is mounted to a rear side of frame 110. A pair of adaptor screws 152 and adaptor washers 153, shown in FIG. 5, attach first plate section 144 to adaptor 150 through a corresponding pair of screw holes 147. Adaptor screws 152 fix first plate section 144 relative to adaptor 150 and frame 110, so that the first plate section cannot be bent or translated relative to the adaptor and frame.

Second plate section 145 is attached to an inner wall 122 of first temple 120. A pair of temple screws 123 and a pair of spacers 124 attach second plate section 145 to a corresponding pair of bosses 125 that project from inner wall 122. Second plate section 145 has a pair of elongated slots 148 that are adapted to receive bosses 125. The width or short dimension of each slot 148 is slightly larger than the diameter of each boss. The length or long dimension of each slot 148 is larger than the diameter of each boss 125 by a sufficient factor to allow second plate section 145 to slide or translate relative to first temple 120 when first temple 120 pivots relative to frame 110, and when plate 142 is extended or hyperextended.

Figure 6:
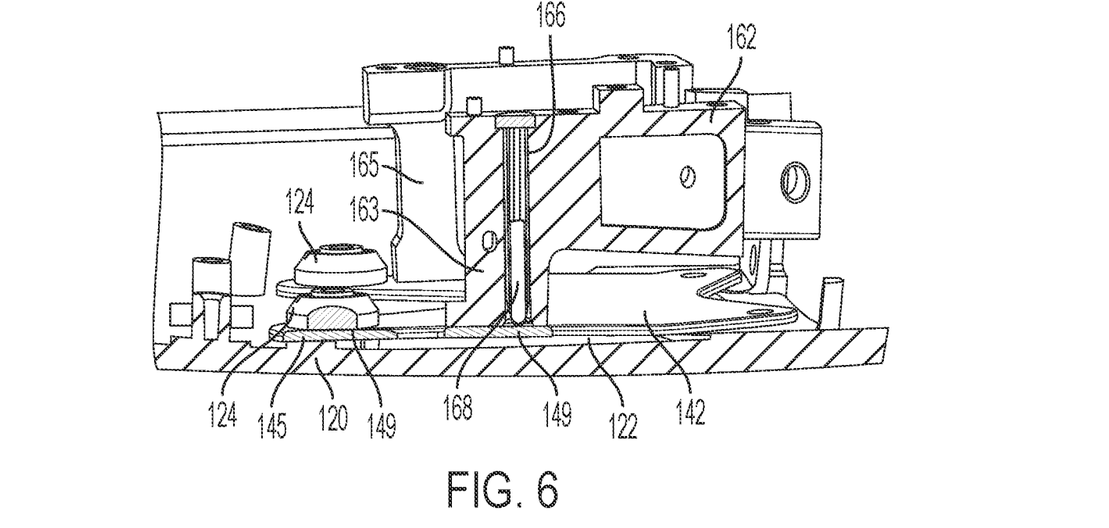
FIG. 6 is an enlarged and truncated perspective view of elements of the eyewear in an assembled state.
Figure 7A:
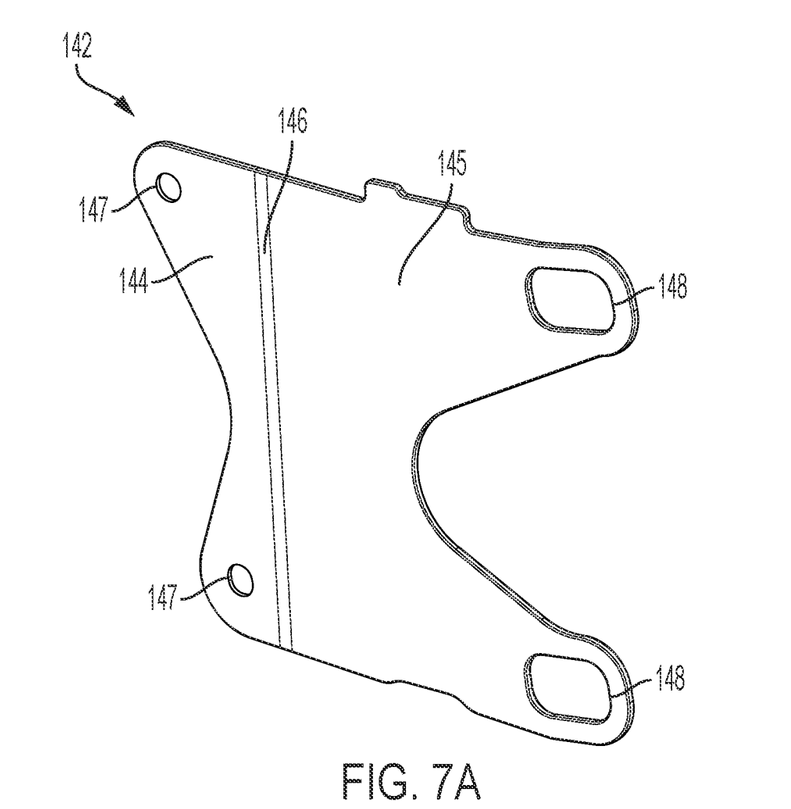
FIG. 7A is a perspective view of a hinge element shown in a relaxed state.
Figure 7B:
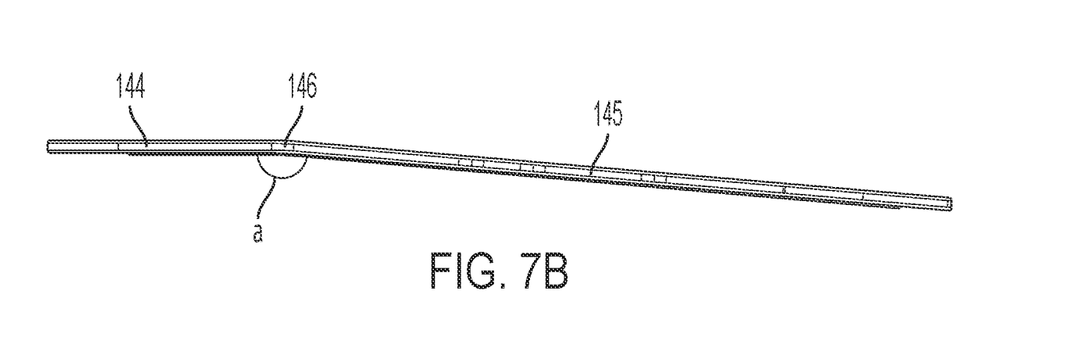
FIG. 7B is a side view of the hinge element shown in the relaxed state.
Figure 8A:
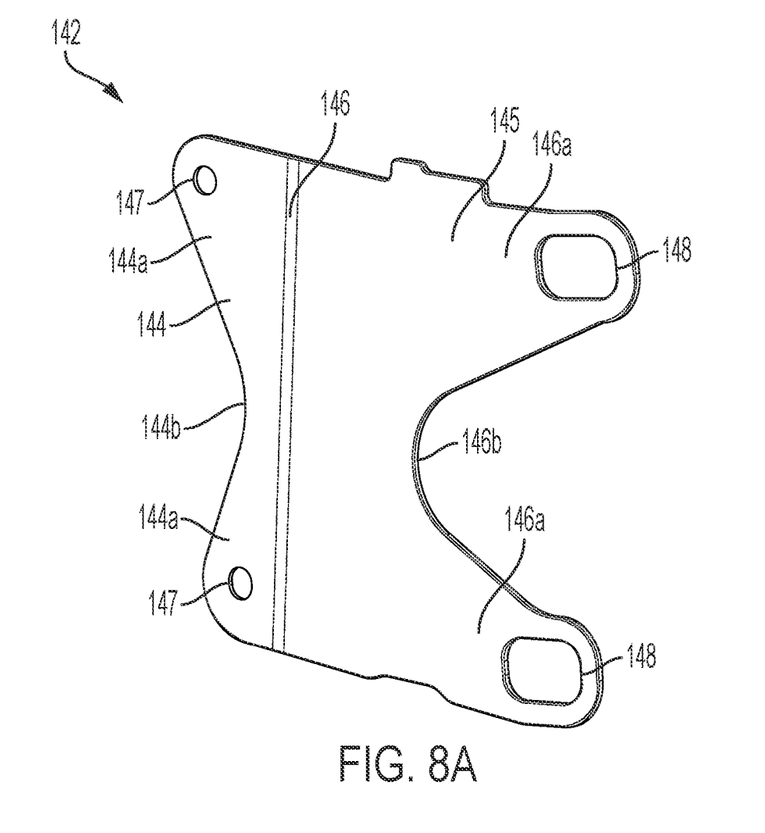
FIG. 8A is a perspective view of the hinge element shown in a pre-loaded state.
Figure 8B:
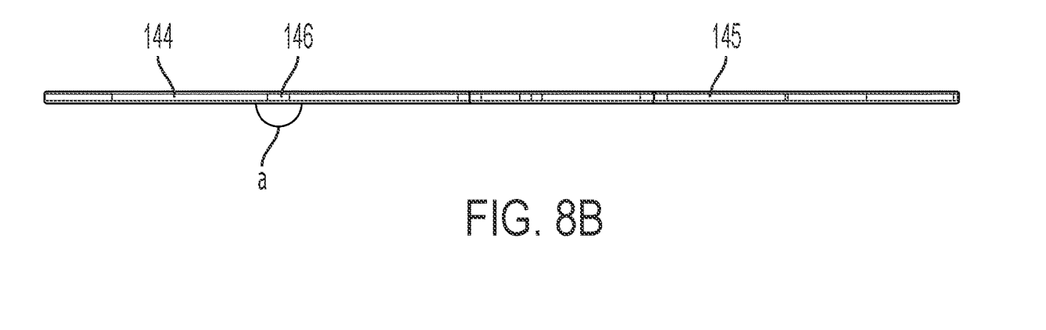
FIG. 8B is a side view of the hinge element shown in the pre-loaded state.

Referring to FIGS. 6-8, plate 142 is formed of a high carbon steel alloy. Plate 142 is stamped from alloy sheet metal and subsequently pre-bent along hinge section 146. In particular, plate 142 is pre-bent along hinge section 146, such that the plate assumes a bent configuration along the hinge section and returns to that configuration by elastic recoil when external forces are removed from the plate. FIGS. 7A and 7B show plate 142 in its relaxed state, in which first plate section 144 is bent at an angle $\alpha$ relative to second plate section 145. Angle $\alpha$ is slightly less than 180 degrees.

Plate 142 is deformed from the relaxed state to a pre-loaded state when the plate is attached to frame 110 and first temple 120. In particular, plate 142 is elastically deformed along hinge section 146 to an extended configuration when first plate section 144 is attached to adaptor 150 and second plate section 145 is attached to first temple 120. Plate 142 assumes a less bent configuration along hinge section 146 in the pre-loaded state, as compared to the relaxed state. FIGS. 8A and 8B show plate 142 as it appears in the pre-loaded state, without the elements around the plate that elastically deform the plate. In this pre-loaded state, angle $\alpha$ between first plate section 144 and second plate section 146 is 180 degrees. Thus, plate 142 is pre-loaded in a flattened state. It will be understood that angle $\alpha$ need not be exactly 180 degrees, but could be any angle greater that the angle realized by the plate in the relaxed state.

When plate 142 is in the pre-loaded state, second plate section 145 is moved relative to first plate section 144 to a nominal position. The tendency of the plate material to recoil generates a bending moment. This bending moment exerts a pre-load force that urges first temple 120 inwardly toward second temple 130 (and vice versa with the second temple and its respective plate). Hinge assembly 140 can be designed to achieve any desired pre-load force. Applicants have found that a pre-load force of 6N in the pre-loaded state performs well, although higher or lower pre-load forces may also be acceptable.

When a user places eyewear 100 on their head, first temple 120 is pivoted further outwardly. If the user's head size falls below a threshold limit, first temple 120 will pivot up to a stopping point, but plate 142 will not hyperextend beyond the nominal position. If the user's head size meets or exceeds the threshold limit, first temple 120 will pivot to the stopping point, at which point second plate section 145 will begin to hyperextend beyond the nominal position to accommodate the user's head size. Hyperextension of second plate section 145 increases the bending moment in hinge section 146. Second plate section 145 translates over bosses 125 as the second plate section is hyperextended, thereby minimizing shear stresses on the bosses.

Second plate section 145 provides a moment arm that extends between hinge section 146 and each slot where the plate is attached to each boss 125. The bending moment applies an inward force at each boss 125, which draws first temple 120 inwardly. The combined inward forces cause first temple 120 to bear against the user's head, providing a secure feel that resists slippage. Plate 142 can be hyperextended to a maximum position, as will be explained, at which point the force reaches a maximum. Applicants have found that a maximum force of 20N performs well without being too firm, although higher or lower maximum forces may also be acceptable.

Second plate section 145 is maintained in the nominal position by a number of internal components. Referring again to FIGS. 4 and 5, adaptor 150 is attached to a first support arm 162 and a second support arm 164. First support arm 162 has a first pressing member 163 that is configured to bear against a first area on second plate section 145. Second support arm 164 has a second pressing member 165 that is configured to bear against a second area on second plate section 145.

First pressing member 163 and second pressing member 165 each define a bore 166, one of which is shown in FIG. 6. Each bore 166 houses a spring-loaded pogo pin 168. Each pogo pin 168 exerts force on second plate section 145 in opposition to the bending moment in hinge section 146. In the assembled state, first pressing member 163, second pressing member 165 and pogo pins 168 bear against second plate section 145 and oppose the bending moment of plate 142. This extends second plate section 145 outwardly (i.e., increases angle α between the first and second plate sections) against the plate's internal bias and maintains the plate in the pre-loaded state, in which the second plate section assumes its nominal position shown in FIGS. 8A and 8B.

Hinge plates according to the present disclosure can be stamped or otherwise produced in a variety of geometries. In the present example, which is not limiting, plate 142 has a lobed geometry featuring "major" and "minor" lobes. The terms "major" and "minor", as used in this context, refer to the relative size of each lobe, with major lobes having a larger surface area than minor lobes. Referring to FIG. 8A, first plate section 144 has a pair of minor lobes 144*a* that facilitate connection with adaptor 150. Second plate section 146 has a pair major lobes 146*a* that facilitate connection with first temple 120. The length of each major lobe, as measured in a direction normal to hinge section 146, can be selected to achieve a desired moment arm. The minor lobes 144*a* are separated by a shallow notch 144*b*, and the major lobes 146*a* are separated by a deep notch 146*b*. The lobes and notches allow the strength of plate 142 to be optimized while reducing the weight of the plate. In addition, lobes and notches provide a profile shape that can be modified to fine tune the pre-load force.

Figure 3:
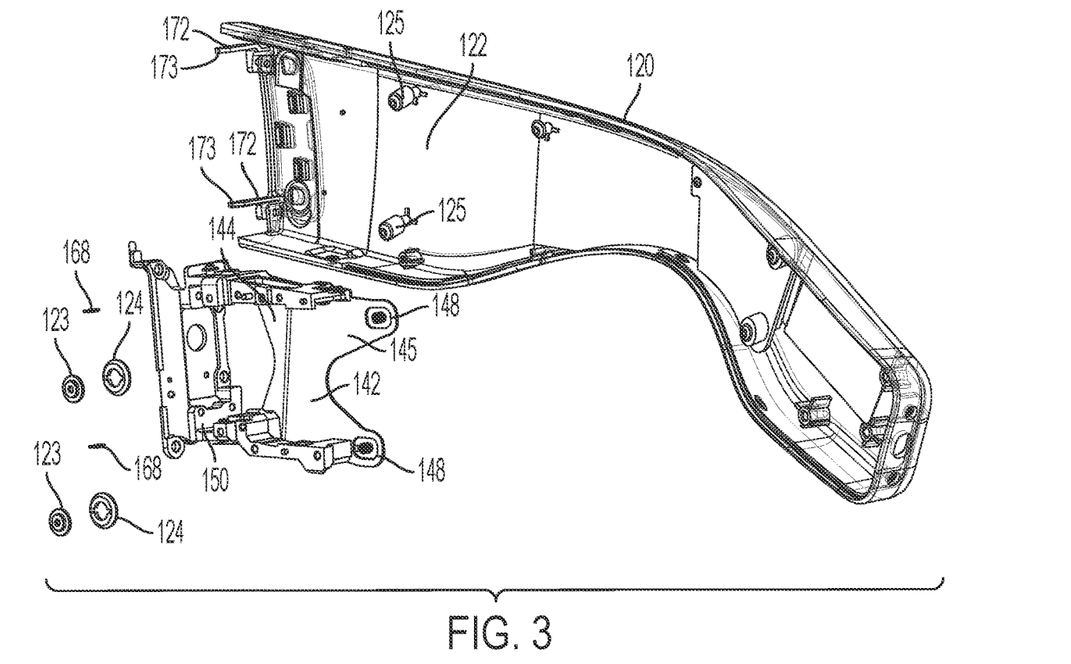
FIG. 3 is an exploded perspective view of elements shown in FIG. 2.
Figure 4:
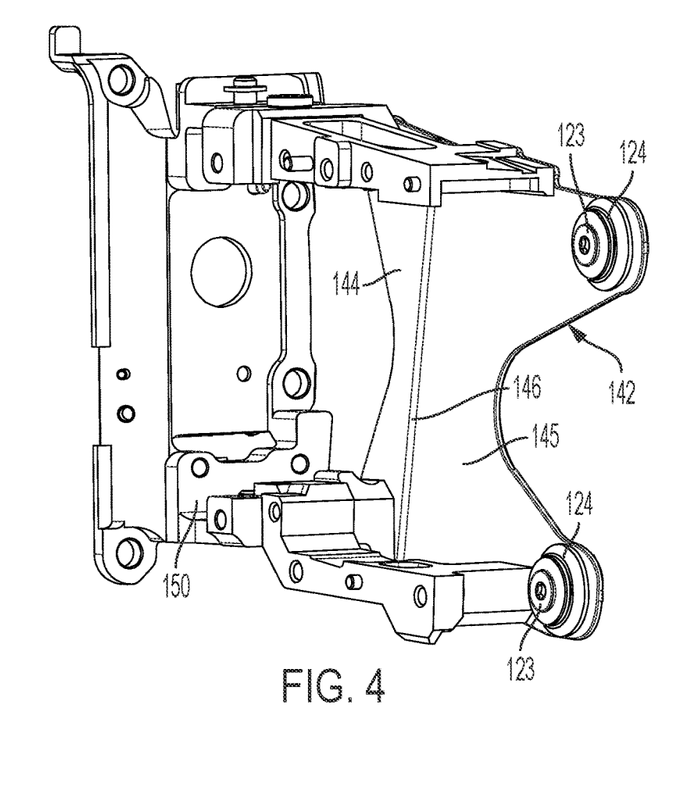
FIG. 4 is a perspective view of elements of the eyewear in an assembled state.
Figure 5:
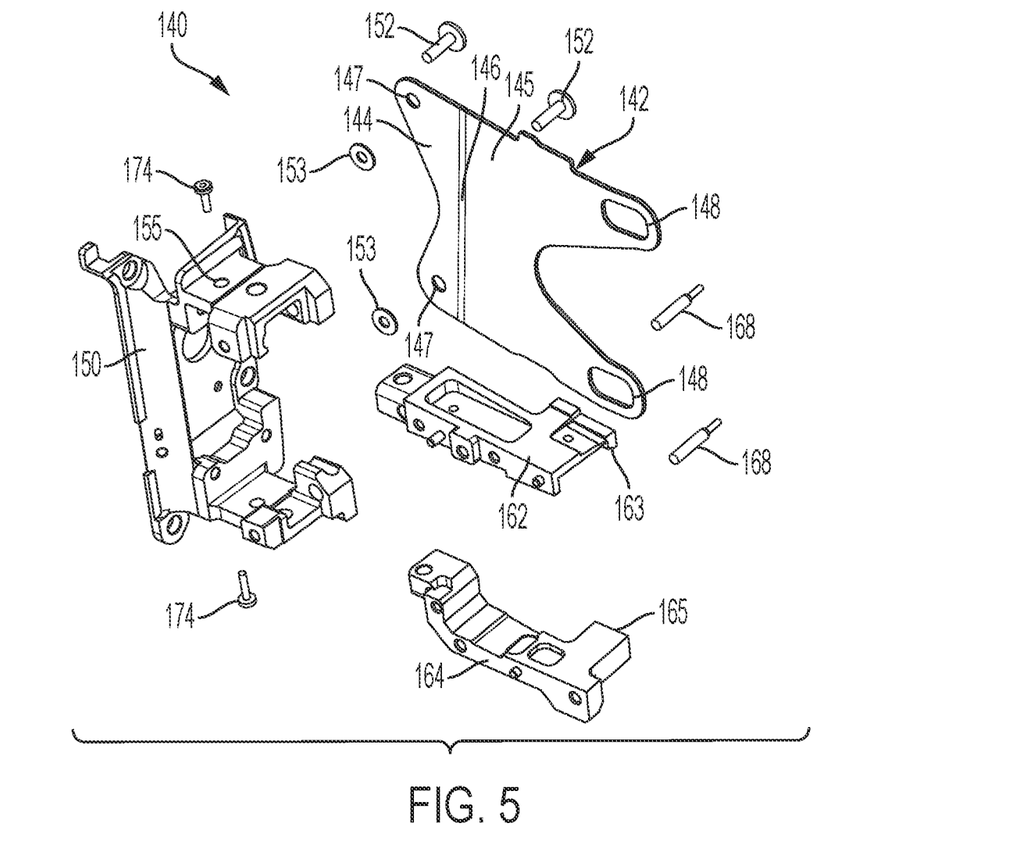
FIG. 5 is an exploded perspective view of elements of the eyewear.
Figure 9:
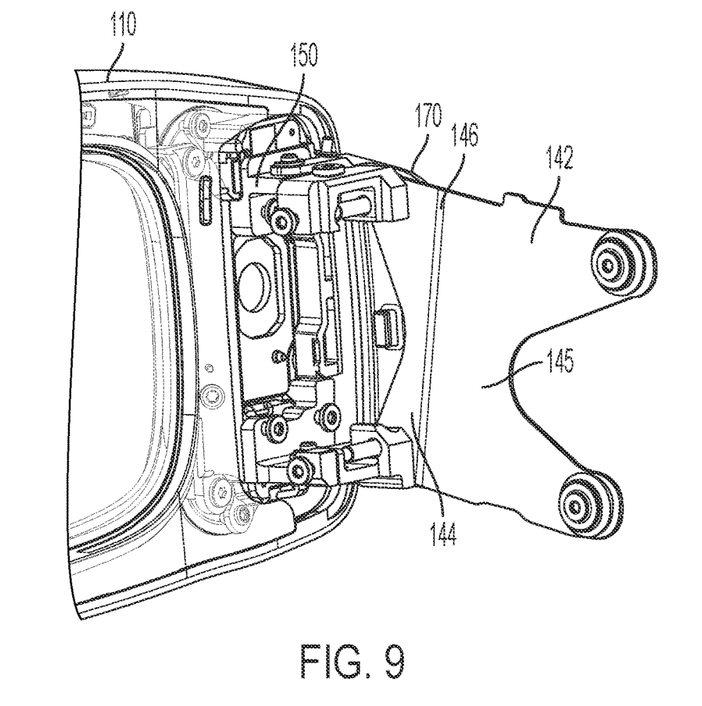
FIG. 9 is a truncated perspective view of elements of the eyewear in the assembled state.
Figure 10:
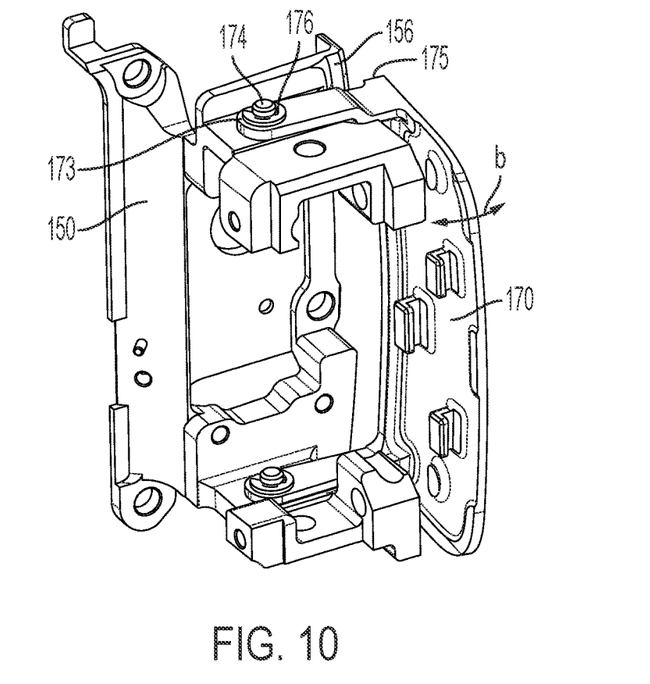
FIG. 10 is an enlarged perspective view of elements of the eyewear in the assembled state.

Hyperextension of temples, if left uncontrolled, can produce undesired amounts of stress on hinge elements and supporting fasteners, possibly leading to failure. Therefore, eyewear according to the present disclosure can include mechanisms for limiting hyperextension of temples. In the present example, eyewear 100 includes a hinge trim 170, which is shown in FIGS. 3, 9 and 10. Hinge trim 170 is attached to the interior of first temple 120 in a fixed manner, such that the hinge trim pivots in unison with the first temple. A pair of pivot arms 172 extend inwardly from hinge trim 170 toward adaptor 150. Each pivot arm 172 has a bore 173 that aligns with a bore 155 (shown best in FIG. 5) on adaptor 150. A grooved pin 174 is inserted through each aligned pair of bores 155, 173 to pivotably connect each pivot arm 172 to adaptor 150, thereby pivotably connecting first temple 120 to adaptor 150 and frame 110. In this arrangement, hinge trim 170 is pivotable relative to adaptor 150 and frame 110 through a pivot angle β of approximately 9.5 degrees, which is shown by the double ended arrow in FIG. 10. An E-clip 176 is attached to each grooved pin 174 to limit axial displacement of hinge trim 170 and prevent pivot arms 172 from sliding upwards on the grooved pins when first temple 120 is pivoted relative to frame 110.

Hinge trim 170 has a front-facing edge 175 that faces toward frame 110 in the assembled state, as shown best in FIG. 10. Front-facing edge 175 is positioned to abut a rear-facing edge on frame 110 when first temple 120 is pivoted to a maximum outward position. Frame 110 therefore acts as a stop with front-facing edge 175 of hinge trim 170 to limit how far first temple 120 can be hyperextended. Hinge trim 170, like hinge assembly 140, can be provided in both the first temple 120 and second temple 130, with the hinge trims having mirrored configurations and arrangements.

Eyewear according to the present disclosure can have electrical and optical components that operate an AR display system, as noted previously. These components can have discontinuities that create time varying E and H fields (electric and magnetic fields) that interfere with the wireless operation of onboard transceivers and neighboring devices, like a user's cell phone. Hinge assemblies according to the present disclosure can have geometries designed not only to provide a mechanical pre-load but also to capture E and H fields and convert them into surface currents when they contact the hinge plate. The converted surface currents can then be electrically shorted by a grounding system. In the present example, hinge assembly 140 has a built-in grounding system featuring four grounded locations 149. Two grounded locations 149 are provided where screws 152 and washers 153 contact the adapter 150. The other two grounded locations 149 are where plate 142 contacts pogo pins 168. The flat or relatively flat geometry of plate 142 acts as a wall that converts the E and H fields to surface currents that are shorted at grounded locations 149. The large surface area provides design flexibility that allows the number and relative position of grounded locations to be changed as needed.

It is understood that various modifications can be made to the examples described in this disclosure, and that the subject matter in this disclosure can be implemented in various forms and combinations.

The following claims are intended to encompass any and all such modifications and variations within the present disclosure.

What is claimed:

1. A hinge assembly for connecting a temple to a frame of eyewear, the hinge assembly comprising:

a hinge element comprising a one-piece body that includes a first hinge element section for attachment to the frame and a second hinge element section for attachment to the temple;

the hinge element pre-bent along a hinge section to assume a bent configuration in a relaxed state, the hinge section separating the first hinge element section from the second hinge element section; and the hinge element deformable from the relaxed state to a pre-loaded state when the first hinge element section is attached to the frame and the second hinge element section is attached to the temple, such that the hinge element connects the temple to the frame under a stored energy that biases the temple inwardly toward a user's head when worn.

2. The hinge assembly of claim 1, wherein the first hinge element section is angularly offset from the second hinge element section by an offset angle $\alpha$, which is less than 180 degrees in the relaxed state.

3. The hinge assembly of claim 2, wherein the offset angle $\alpha$ is greater than or equal to 180 degrees in the pre-loaded state.

4. The hinge assembly of claim 1, wherein the second hinge element section comprises at least one slot configured to permit translation of the hinge element relative to the temple in an assembled state.

5. The hinge assembly of claim 1, further comprising a built-in grounding system.

6. The hinge assembly of claim 5, wherein the built-in grounding system comprises the hinge element and at least one fastener that connects the hinge element to one of the temple or the frame.

7. The hinge assembly of claim 6, wherein the at least one fastener comprises one of a screw and a pogo pin.

8. The hinge assembly of claim 1, wherein the hinge element is formed of a high carbon steel alloy.

9. Eyewear comprising:
a frame having a first end and a second end;
a first temple;
a second temple;
a first hinge assembly that pivotably connects the first temple to the first end of the frame; and
a second hinge assembly that pivotably connects the second temple to the second end of the frame,
each of the first hinge assembly and the second hinge assembly comprising:
a hinge element comprising a one-piece body that includes a first hinge element section attached to the frame and a second hinge element section attached to one of the first and second temples,
the hinge element pre-bent along a hinge section that separates the first hinge element section from the second hinge element section,
the hinge element attached to the frame and said one of the first and second temples in a pre-loaded state in which the second hinge element section is extended relative to the first hinge element section along the hinge section and stores energy in the hinge element, and
the energy stored in the hinge element operable to bias said one of the first and second temples toward a user's head when the eyewear is worn.

10. The eyewear of claim 9, wherein, in each hinge assembly, the first hinge element section is angularly offset from the second hinge element section by an angle $\alpha$ of 180 degrees in the pre-loaded state.

11. The eyewear of claim 9, wherein, in each hinge assembly, the second hinge element section translates relative to one of the first and second temples when said one of the first and second temples pivots relative to the frame.

12. The eyewear of claim 9, wherein each hinge assembly comprises a radio frequency (RF) shield for shielding components in the eyewear from electromagnetic interference.

13. The eyewear of claim 12, wherein, in each hinge assembly, the RF shield comprises the hinge element and at least one fastener.

14. The eyewear of claim 13, wherein the at least one fastener comprises one of a screw and a pogo pin.

15. The eyewear of claim 9, wherein the hinge element is formed of a high carbon steel alloy.

16. The eyewear of claim 9, wherein, in each hinge assembly, the first hinge element section is pivotally attached to the frame.

17. The eyewear of claim 16, further comprising:
a first hinge trim that pivotably connects the first hinge element section of the first hinge assembly to the frame; and
a second hinge trim that pivotably connects the first hinge element section of the second hinge assembly to the frame.

18. The eyewear of claim 17, wherein each of the first hinge trim and the second hinge trim is pivotable relative to the frame through an angle $\beta$ that is less than 90 degrees.

19. The eyewear of claim 17, wherein, for each hinge assembly, the eyewear further comprises an adapter that connects the hinge element to the frame.

20. The eyewear of claim 19, wherein, for each hinge assembly, the eyewear further comprises at least one support arm attached to the adapter that bears against the hinge element to maintain the hinge element in the pre-loaded state.

21. A method of assembling eyewear having a frame, a first temple, a second temple, a first hinge element and a second hinge element, the method comprising the steps of:
attaching a first hinge section of the first hinge element to a first end of the frame;
attaching a second hinge section of the first hinge element to the first temple;
securing the second hinge section of the first hinge element to the first temple to place the first hinge element in a first pre-loaded state;
attaching a first hinge section of the second hinge element to a second end of the frame;
attaching a second hinge section of the second hinge element to the second temple;
securing the second hinge section of the second hinge element to the second temple to place the second hinge element in a second pre-loaded state,
the first pre-loaded state of the first hinge element operable to bias the first temple toward a user's head when the eyewear is worn, and
the second pre-loaded state of the second hinge element operable to bias the second temple toward the user's head when the eyewear is worn.

* * * * *